United States Patent Office 2,971,938
Patented Feb. 14, 1961

2,971,938

PLASTICIZING HIGH MOLECULAR WEIGHT POLYISOBUTYLENE WITH TERPENE-PHENOL RESINS

Lester R. McNall, Los Angeles, Calif., and William John G. McCulloch, Plainfield, and Charles E. Farnsworth, South Orange, N.J., assignors to Esso Research and Engineering Company, a corporation of Delaware No Drawing. Filed Aug. 28, 1957, Ser. No. 680,677

5 Claims. (Cl. 260—45.5)

This invention pertains to a new composition of matter and to a method of producing the same.

It is an object of this invention to provide the art with an improved synthetic rubber-like material.

It is a further object of this invention to prepare compositions of low temperature isoolefin polymers of improved physical properties.

These and other objects will appear more clearly from the detailed description and claims which follow.

It is known that very valuable rubber-like polymeric substances can be produced by polymerizing an isoolefin of 4 to 5 carbon atoms per molecule, preferably isobutylene, by a low temperature procedure, and in the presence of a solution of a Friedel-Crafts type catalyst in a low-freezing solvent which does not form a complex therewith, such as methyl or ethyl chloride or carbon disulfide. The temperatures applied range from about $-40°$ C. to $-100°$ C. or $-150°$ C. or lower, the preferred range being from $-80°$ C. to $-103°$ C. This polymer has an average molecular weight ranging between 100,000 and 500,000 Staudinger.

One of the major criticisms of this polymer, particularly when the molecular weight thereof is above 80,000 (Staudinger), has been the difficulty encountered in processing it, i.e., rolling or calendering, extruding and the like. For example, attempts have been made to utilize a composition comprising said polymer as insulation on electrical wire by extruding it around a wire core. It has been found unsatisfactory, however, not only because of the low rate at which it can be extruded but also because of the rough appearance of the coated wire obtained. Considerable difficulty has also been encountered in finding addition agents which are capable of improving the polymer and of making it more readily processable.

In order effectively to modify the properties of this polymer, the modifying agent must be a thermoplastic resinous material which is at least partially compatible with the polymer. The latter feature is important in order that the modifying agent will become thoroughly and uniformly blended with the polymer.

It has now been found that the processing of the polymers of an isoolefin may be very markedly facilitated, if there is incorporated therewith a resin obtained by condensing a terpene with a phenol. These resins are prepared by reacting various terpenes such as dipentene, pinene, limonene and various turpentine cuts with phenols such as phenol, cresol, alkylated phenols, for example, normal butyl phenol, tertiary butyl phenol, propyl phenol and the like in the presence of a catalyst such as sulfuric acid, sulfonic acids, aluminum chloride, boron trifluoride or the molecular compounds of boron fluoride with ethers, acids, alcohols and phenols as described in U.S. Patent No. 2,343,845, the disclosures of which are incorporated herein by reference. A particularly suitable resin is that obtained by the condensation of alpha pinene and phenol using $BF_3$-etherate as the catalyst in accordance with U.S. Patent No. 2,343,845 and known by the trade names of V–40 and Alphor S.

The resins may be blended with the polymers of an isoolefin in the ratio of from about 2 to about 30 parts by weight of the former with from about 98 to about 70 parts by weight of the latter. The preferred ratio is from 5 to 20 parts of the resin with 95 to 80 parts of rubber. The polymer and the resin may be mixed in any desired way as by milling on rollers or in a mixer of the Banbury type at a temperature of 250°–350° F., preferably 300°–310° F.

Depending upon the use of which the products are to be put, there may be incorporated therewith the usual compounding ingredients, such as fillers, pigments, carbon black and the like in suitable quantities. Small amounts of other polymers, such as polyethylenes or polypropylene, may be added if desired. The resultant compositions are characterized by being much easier to work up on milling rollers, calenders, or the like and by being extrudable at a much faster rate than the isoolefin polymer per se.

The following examples serve to illustrate the present invention, but it is to be understood that the invention is by no means limited thereto:

*Example I*

A mixture containing 170 grams of alpha pinene and 30 grams of phenol were added to a flask containing 3 cc. of a molecular compound of boron trifluoride and diethyl ether containing 50% boron trifluoride by weight and 20 cc. of toluene. The reaction flask was immersed in an ice bath so that the temperature of reaction could be maintained between 0° C. and 5° C. At the end of forty-five minutes, the time required for addition of the alpha pinene-phenol mixture, the resin formed was separated from the reaction mixture by distilling at 5 mm. vacuum. One hundred and four grams of a pale colored resin having a melting point of 100° C. as determined by the ball and ring method were recovered as residue.

*Example II*

100 parts by weight of isobutylene was diluted with about 200 parts of liquid ethylene at a temperature of about $-95°$ C. to $-100°$ C. A 1% solution of aluminum chloride in ethyl chloride precooled to about $-100°$ C. was then sprayed into this reaction mixture in the ratio of about 1 part of the catalyst solution for each 25 parts of reaction mixture and the whole mixture was thoroughly agitated. The polymerization proceeded with high speed and was complete within a few minutes. The polymerization is exothermic and the heat generated was dissipated by vaporization of the ethylene. The reaction mixture was quenched and the solid polymer was separated from the residual ethylene and methyl chloride. The resultant polymer had a molecular weight of about 240,000.

*Example III*

The isobutylene polymer of Example II was milled and a portion of it was extruded as a solid rod without any loading material through an extruder fitted with an 0.4 inch die and 0.3 inch pin.

Other portions of the isobutylene polymer were mixed with the terpene-phenol resin prepared as described in Example I in accordance with the following recipe:

| | Parts |
|---|---|
| Polyisobutylene | 100 |
| 2,6 di-tertiary butyl p-cresol | 2.0 |
| Terpene-phenol resin | 10 |

After thorough milling each of these samples were extruded through the same extruder under the same temperature conditions, i.e., 90 lbs. of steam on the head and on the barrel. The following results were obtained:

|  | Polybutene | Polybutene+ Resin |
|---|---|---|
| Tensile Strength, p.s.i. | 3,000 | 3,420 |
| Elongation, percent | 980 | 940 |
| Modulus: |  | 210 |
| 100% |  | 265 |
| 300% | 100 | 320 |
| 500% | 135 | 1,070 |
| 700% | 495 |  |
| Extrusion: |  |  |
| Inches/minute | 50 | 67.5 |
| Grams/minute | 120 | 166.2 |
| Swell Index | 4.5 | 2.5 |

The above resutls show that blends of terpene-phenol resin form a readily extrudable composition which has good tensile and elongation properties.

Thus, in accordance with the invention, very high molecular weight polyisobutylenes of 100,000 molecular weight and above are plasticized by the addition of 2 to 30 parts by weight of a terpene-phenol or similar type resin. The products thus obtained swell much less than in the absence of the resin.

The nature of the present invention having been thus fully set forth and specific examples of the same given, what is claimed as new and useful and desired to be secured by Letters Patent is:

What is claimed is:

1. A composition of matter, of improved processing properties, comprising a physical mixture of from 2 to 30 parts by weight of a resinous condensation product of a terpene and a phenol with from 98 to 70 parts by weight of a polymer having a molecular weight in the range of 100,000 to 500,000 of an isoolefin having from 4 to 5 carbon atoms.

2. The composition of claim 1 in which the terpene is an alpha terpene.

3. The composition of claim 2 in which the resinous condensation product is utilized in an amount of 5 to 20 parts by weight with the balance polymer.

4. The composition of claim 2 in which the isoolefin is isobutylene.

5. The composition of claim 4 in which the terpene is alpha pinene.

References Cited in the file of this patent

UNITED STATES PATENTS

| 2,343,845 | Powers | Mar. 7, 1944 |
| 2,801,981 | Spacht | Aug. 6, 1957 |

FOREIGN PATENTS

| 852,453 | France | Feb. 2, 1940 |